(12) United States Patent
King, Jr. et al.

(10) Patent No.: US 8,930,738 B1
(45) Date of Patent: Jan. 6, 2015

(54) BATTERY BACKUP SYSTEM

(75) Inventors: Joseph P. King, Jr., Sterling, MA (US); Phillip J. Roux, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 603 days.

(21) Appl. No.: 12/982,139

(22) Filed: Dec. 30, 2010

(51) Int. Cl.
*G06F 1/30* (2006.01)
*H01R 3/00* (2006.01)

(52) U.S. Cl.
USPC .......................................... 713/340; 439/500

(58) Field of Classification Search
CPC ............................... G06F 1/26; H01M 2/1016
USPC .......................................... 713/340; 439/500
See application file for complete search history.

(56) References Cited

U.S. PATENT DOCUMENTS

| | | | | |
|---|---|---|---|---|
| 4,860,185 A * | 8/1989 | Brewer et al. | .................... | 363/41 |
| 5,425,079 A * | 6/1995 | Noda et al. | ........................ | 379/68 |
| 5,906,506 A * | 5/1999 | Chang et al. | .................. | 439/500 |
| 6,998,821 B2 * | 2/2006 | Sakai et al. | .................... | 320/138 |
| 7,199,489 B2 * | 4/2007 | Gottlieb et al. | ................. | 307/66 |

\* cited by examiner

*Primary Examiner* — Kim Huynh
*Assistant Examiner* — Eric Chang
(74) *Attorney, Agent, or Firm* — Brian J. Colandreo; Mark H. Whittenberger; Holland & Knight LLP

(57) ABSTRACT

A common form-factor battery backup system includes a battery system configured to provide electrical energy to an external system. A control circuit is configured to compare a monitored voltage level associated with the external system to a minimum acceptable voltage level and, if the monitored voltage is less than the minimum acceptable voltage level, provide electrical energy from the battery system to the external system. The battery backup system is configured to fit within a common form-factor storage space within a data system.

19 Claims, 2 Drawing Sheets

BATTERY BACKUP SYSTEM

TECHNICAL FIELD

This disclosure relates to battery backup systems and, more particularly, to internal battery back systems.

BACKGROUND

Battery backup systems are often utilized to provide electrical energy to electronic devices in the event of power failure. For example, battery backup systems may monitor the status of utility power to determine when a power failure event has occurred. In the event of such a failure, the electronic device is disconnected from the utility power and connected to a battery included within the battery backup system.

Unfortunately, such battery backup systems are often bulky and reside outside of the electronic device being protected. For example, the battery backup system may plug into a wall outlet and the device being protected may be plugged into the battery backup system. Alternatively, such battery backup systems may be incorporated into the device being protected. Unfortunately, such battery backup systems often require that the electronic device into which they are being incorporated include a special space within the enclosure that would accommodate the battery backup system.

SUMMARY OF DISCLOSURE

In a first implementation, a common form-factor battery backup system includes a battery system configured to provide electrical energy to an external system. A control circuit is configured to compare a monitored voltage level associated with the external system to a minimum acceptable voltage level and, if the monitored voltage is less than the minimum acceptable voltage level, provide electrical energy from the battery system to the external system. The battery backup system is configured to fit within a common form-factor storage space within a data system.

One or more of the following features may be included. The common form-factor storage space may be chosen from the group consisting of: a hard drive form-factor storage space; an optical drive form-factor storage space, a memory module form-factor storage space, and a blade form-factor storage space. The battery system may be a lithium-ion battery. The control circuit may be further configured to charge the battery system. The control circuit may be further configured to charge the battery system to a voltage level proximate the minimum acceptable voltage level. The control circuit may be further configured to communicate with one or more additional battery backup systems. The control system may be further configured to allow a backup period to be defined, wherein the backup period defines the amount of time that electrical energy is provided from the battery system to the external system.

In another implementation, a common form-factor battery backup system includes a battery system configured to provide electrical energy to an external system. A control circuit is configured to charge the battery system, compare a monitored voltage level associated with the external system to a minimum acceptable voltage level, and if the monitored voltage is less than the minimum acceptable voltage level, provide electrical energy from the battery system to the external system. The battery backup system is configured to fit within a hard drive form-factor storage space within a data system.

One or more of the following features may be included. The battery system may be a lithium-ion battery. The control circuit may be further configured to charge the battery system to a voltage level proximate the minimum acceptable voltage level. The control circuit may be further configured to communicate with one or more additional battery backup systems. The control system may be further configured to allow a backup period to be defined, wherein the backup period defines the amount of time that electrical energy is provided from the battery system to the external system.

In anther implementation, a common form-factor battery backup system includes a battery system configured to provide electrical energy to an external system if a monitored voltage associated with the external system is less than a minimum acceptable voltage level. A control circuit is configured to charge the battery system. The battery backup system is configured to fit within a common form-factor storage space within a data system.

One or more of the following features may be included. The common form-factor storage space may be chosen from the group consisting of: a hard drive form-factor storage space; an optical drive form-factor storage space, a memory module form-factor storage space, and a blade form-factor storage space. The battery system may be a lithium-ion battery. The control circuit may be further configured to: compare the monitored voltage level associated with the external system to the minimum acceptable voltage level, and if the monitored voltage is less than the minimum acceptable voltage level, provide electrical energy from the battery system to the external system. The control circuit may be further configured to charge the battery system to a voltage level proximate the minimum acceptable voltage level. The control circuit may be further configured to communicate with one or more additional battery backup systems. The control system may be further configured to allow a backup period to be defined, wherein the backup period defines the amount of time that electrical energy is provided from the battery system to the external system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
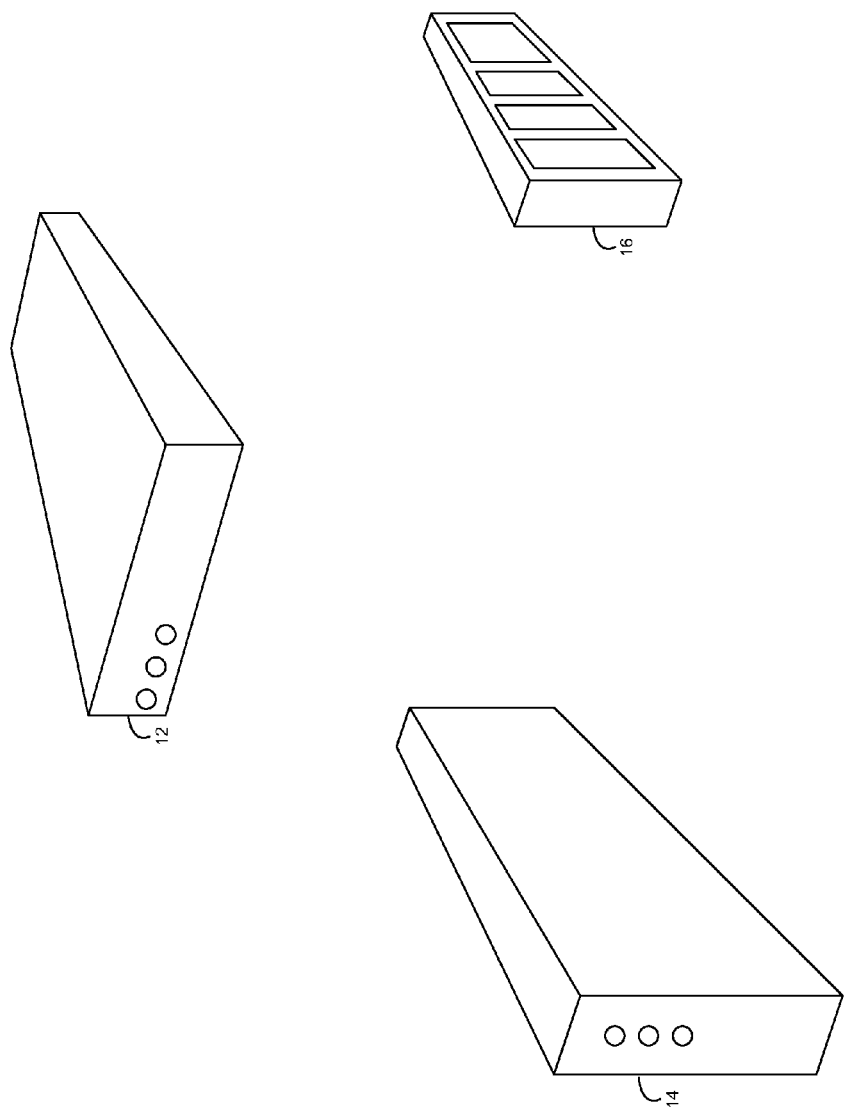
FIG. 1 is a diagrammatic view of various implementations of a battery backup system.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing various functions/acts.

Referring to FIG. 1, there is shown common form factor battery backup system 10, which may be configured to fit within a common form factor storage space within a data system (e.g. a computing device). Examples of such a common form-factor storage space may include but are not limited to: a hard drive form-factor storage space (e.g. a space within a computing device configured to receive a hard drive); an optical drive form-factor storage space (e.g. a space within a computing device configured to receive an optical drive); a memory module form-factor storage space (e.g. a space within a computing device configured to receive a memory module); and a blade form-factor storage space (e.g. a space within a computing device configured to receive a blade).

Accordingly, common form factor battery backup system 10 may be configured to fit within: a hard drive/optical drive form factor storage space (see hard drive/optical drive form factor battery backup system 12); a blade form factor storage space (see blade form factor battery backup system 14); and a memory module form factor storage space (see memory module form factor battery backup system 16).

Figure 2:
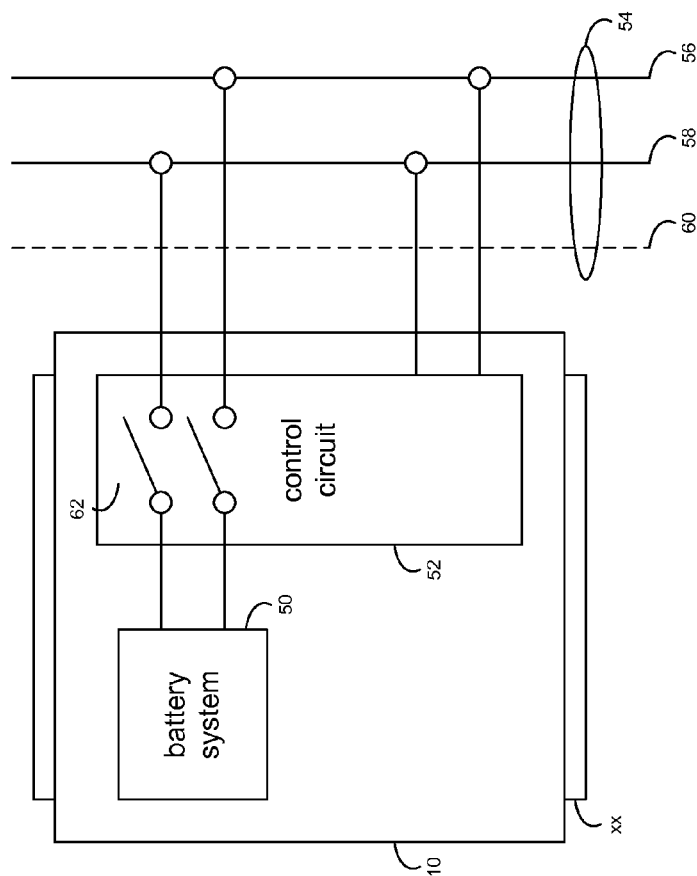
FIG. 2 is a diagrammatic view of the battery backup system of FIG. 1.

Referring also to FIG. 2, common form factor battery backup system 10 may include battery system 50 and control circuit 52. Battery system 50 may include one or more lithium-ion batteries or any other battery technology that allows for storage of the appropriate quantity of energy needed by the device(s) to which backup power will be provided. Battery system 50 may be configured to provide electrical energy (in the form of battery backup power) to an external system (e.g., electrical bus 54 of the computing device). Control circuit 52 may be configured to compare a monitored voltage level associated with the external system (e.g., electrical bus 54) to a minimum acceptable voltage level. If the monitored voltage is less than the minimum acceptable voltage level, control circuit 52 may provide electrical energy from battery system 50 to the external system (e.g., electrical bus 54).

For example, assume for illustrative purposes that electrical bus 54 is an electrical bus within a server computer. Assume that, in this example, electrical bus 54 includes three conductors, namely ground conductor 56, +5 VDC conductor 58, and +12 VDC conductor 60. Further assume for this example that control circuit 52 within common form factor battery backup system 10 is configured to compare the voltage level of +5 VDC conductor 58 (i.e., the monitored voltage level) to a minimum voltage level (e.g. +4.8 VDC) associated with (i.e., expected from) the monitored voltage.

Control circuit 52 may include or may be in control of switch assembly 62 (e.g., a solid state or mechanical switch assembly) that may be configured to selectively couple battery system 50 to, in this example, electrical bus 54 of the computing device. Accordingly, as long as +5.0 VDC conductor 52 has a voltage potential of greater than +4.8 VDC, switch assembly 62 may be maintained in the open position, thus isolating battery system 50 from electrical bus 54. Continuing with the above stated example, assume that, upon comparing the voltage potential present on +5.0 VDC conductor 52 with the minimum voltage level of e.g. +4.8 VDC, is determined by control circuit 52 that +5.0 VDC conductor 56 has a voltage potential of only +4.6 VDC (i.e. +0.2 VDC below the minimum voltage level of +4.8 VDC). Accordingly, a low voltage condition is occurring within electrical bus 54. Therefore, control circuit 52 within common form factor battery backup system 10 may toggle switch assembly 62 into a closed position, thus electrically coupling battery system 50 electrical bus 54.

Control circuit 52 may maintain switch assembly 62 in a closed position as long as electrical bus 54 is malfunctioning. For example, control circuit 52 may be configured to momentarily interrupt the connection between battery system 50 and electrical bus 54 (for a duration of time that will not result in data loss) to determine whether electrical bus 54 has been restored. Alternatively, battery system 50 may be configured to supply a reduced voltage level (e.g., +4.4 VDC) to electrical bus 54 that is less than the minimum voltage level (e.g. +4.8 VDC). This reduced voltage level may be sufficient to allow the other devices coupled to electrical bus 54 to continue to function properly. Accordingly, if control circuit 52 continues to monitor the voltage level of e.g., +5.0 VDC conductor 58, in the event that the voltage level monitored is only +4.4 VDC (i.e., the reduced voltage level supplied by battery system 50), control circuit 52 may maintain switch assembly 62 in the closed position, as proper operation of electrical bus 54 has not yet been restored. However, if control circuit 52 determines that the voltage level of +5.0 VDC conductor 58 is +5.0 VDC, control circuit 52 may toggle switch assembly 52 to the open position (thus isolating battery system 50 from electrical bus 54), as the proper operation of electrical bus 54 has been restored.

Control circuit 52 may be configured to charge battery system 50. For example, one or more diode assemblies (not shown) may be configured to allow battery system 52 be charged by electrical bus 54 while prohibiting the outward flow of current from battery system 52 to electrical bus 54. Accordingly, battery system 50 may be maintained in a charge state even though it is isolated from electrical bus 54 via switch assembly 62 being maintained in an open position by control circuit 52.

As discussed above, battery system 50 may be charged to a voltage level (e.g., +4.4 VDC) that is less than the minimum acceptable voltage level (e.g., +4.8 VDC). Accordingly, control circuit 52 may be configured to charge battery system 50 to a voltage level proximate the minimum acceptable voltage level (e.g., +4.8 VDC). Specifically, the voltage level of battery system 50 may be slightly higher (e.g., +5.0 VDC) than the minimum acceptable voltage level (e.g. +4.8 VDC) for some applications. Alternatively, the voltage level battery system 50 may be slightly lower (e.g., +4.4 VDC) than the minimum acceptable voltage level (e.g. +4.8 VDC) for other applications.

Control circuit 52 may be further configured to allow for communication between common form factor battery backup system 10 and other battery backup systems included within the computing device. For example, multiple common form factor battery backup systems may be included within a single computing device. Accordingly, each of these common form factor battery backup systems may be configured to communicate with each other by e.g. modulating a data signal which is communicated via electrical bus 54. Alternatively, each of the common form factor battery backup systems may be coupled via a data/communication bus or may be configured to communicate wirelessly. Accordingly, through the use of such communication, coordination between the common form factor battery backup systems is possible, thus allowing for e.g. a coordinated supply of backup power being provided, the designation of master/slave devices, the obtaining of health statistics/trouble codes for each of the common form factor battery backup systems and/or the definition of the minimum acceptable voltage level.

Control system 52 (via one or more switches included within common form factor battery backup system 10 or via a remote configuration application, not shown) may allow a user to configure various aspects of common form factor battery backup system 10. For example, control system 52 may allow a user to define a backup period, wherein the backup period defines the amount of time that electrical energy is provided from battery system 50 to the external system (e.g. electrical bus 54). Alternatively/additionally, control system 52 may allow a user to define the voltage level to which battery system 50 is charged. Alternatively/additionally control system 52 may allow a user to define notification procedures to be followed in the event of a power failure event.

While the system is described above as utilizing lithium ion batteries, this is for illustrative purposes only and is not intended to be a limitation of this disclosure, as other configurations are possible and are considered to be within the scope of this disclosure. For example, the particular battery technology utilized in the above-described system may vary depending upon the specific requirements of the system. For example, if a system is required that provides long term battery backup power, a battery technology that has a higher level of power density may be utilized. However, if a system is required that only provides short term battery backup power (e.g., until an onsite generator is started), a battery technology that has a lower level of power density may be utilized. Accordingly, while the system is described above as utilizing lithium ion battery technology, other configurations (e.g., nickel cadmium, nickel metal hydroxide, and/or future developed technology) may be utilized.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Nevertheless, it will be understood that various modifications may be made. Accordingly, other implementations are within the scope of the following claims.

What is claimed is:

1. A common form-factor battery backup system comprising:
   a battery system configured to provide electrical energy to an external system;
   a control circuit configured to:
      compare a monitored voltage level associated with the external system to a minimum acceptable voltage level, wherein the minimum acceptable voltage level is a predefined non-zero voltage level,
      if the monitored voltage is less than the minimum acceptable voltage level, provide electrical energy from the battery system to the external system until the monitored voltage level associated with the external system is at least the minimum acceptable voltage level, and
      monitor a voltage level of the external system while the battery system provides electrical energy to the external system, including periodically supplying a reduced voltage level from the battery system to the external system to determine if the voltage level associated with the external system is at least the minimum acceptable voltage level, wherein the reduced voltage level is less than the minimum acceptable voltage level;
   wherein the battery backup system is configured to fit within a common form-factor storage space within a data system.

2. The common form-factor battery backup system of claim 1 wherein the common form-factor storage space is chosen from the group consisting of: a hard drive form-factor storage space; an optical drive form-factor storage space, a memory module form-factor storage space, and a blade form-factor storage space.

3. The common form-factor battery backup system of claim 1 wherein the battery system is a lithium-ion battery.

4. The common form-factor battery backup system of claim 1 wherein the control circuit is further configured to charge the battery system.

5. The common form-factor battery backup system of claim 1 wherein the control circuit is further configured to charge the battery system to a voltage level proximate the minimum acceptable voltage level.

6. The common form-factor battery backup system of claim 1 wherein the control circuit is further configured to communicate with one or more additional battery backup systems.

7. The common form-factor battery backup system of claim 1 wherein the control system is further configured to allow a backup period to be defined, wherein the backup period defines the amount of time that electrical energy is provided from the battery system to the external system.

8. A common form-factor battery backup system comprising:
   a battery system configured to provide electrical energy to an external system;
   a control circuit configured to:
      charge the battery system,
      compare a monitored voltage level associated with the external system to a minimum acceptable voltage level, wherein the minimum acceptable voltage level is a predefined non-zero voltage level,
      if the monitored voltage is less than the minimum acceptable voltage level, provide electrical energy from the battery system to the external system until the monitored voltage level associated with the external system is at least the minimum acceptable voltage level, and
      monitor a voltage level of the external system while the battery system provides electrical energy to the external system, including periodically supplying a reduced voltage level from the battery system to the external system to determine if the voltage level associated with the external system is at least the minimum acceptable voltage level, wherein the reduced voltage level is less than the minimum acceptable voltage level;
   wherein the battery backup system is configured to fit within a hard drive form-factor storage space within a data system.

9. The common form-factor battery backup system of claim 8 wherein the battery system is a lithium-ion battery.

10. The common form-factor battery backup system of claim 8 wherein the control circuit is further configured to charge the battery system to a voltage level proximate the minimum acceptable voltage level.

11. The common form-factor battery backup system of claim 8 wherein the control circuit is further configured to communicate with one or more additional battery backup systems.

12. The common form-factor battery backup system of claim 8 wherein the control system is further configured to allow a backup period to be defined, wherein the backup period defines the amount of time that electrical energy is provided from the battery system to the external system.

13. A common form-factor battery backup system comprising:
   a battery system configured to provide electrical energy to an external system if a monitored voltage associated with the external system is less than a minimum acceptable voltage level, wherein the minimum acceptable voltage level is a predefined non-zero voltage level, wherein the battery system provides electrical energy to the external system until the monitored voltage level associated with the external system is at least the minimum acceptable voltage level, wherein a voltage level of the external system while the battery system provides electrical energy to the external system is monitored by periodically supplying a reduced voltage level from the battery system to the external system to determine if the voltage level associated with the external system is at least the minimum acceptable voltage level, wherein the reduced voltage level is less than the minimum acceptable voltage level; and a control circuit configured to charge the battery system;
wherein the battery backup system is configured to fit within a common form-factor storage space within a data system.

14. The common form-factor battery backup system of claim 13 wherein the common form-factor storage space is chosen from the group consisting of: a hard drive form-factor storage space; an optical drive form-factor storage space, a memory module form-factor storage space, and a blade form-factor storage space.

15. The common form-factor battery backup system of claim 13 wherein the battery system is a lithium-ion battery.

16. The common form-factor battery backup system of claim 13 wherein the control circuit is further configured to:
   compare the monitored voltage level associated with the external system to the minimum acceptable voltage level, and
   if the monitored voltage is less than the minimum acceptable voltage level, provide electrical energy from the battery system to the external system.

17. The common form-factor battery backup system of claim 13 wherein the control circuit is further configured to charge the battery system to a voltage level proximate the minimum acceptable voltage level.

18. The common form-factor battery backup system of claim 13 wherein the control circuit is further configured to communicate with one or more additional battery backup systems.

19. The common form-factor battery backup system of claim 13 wherein the control system is further configured to allow a backup period to be defined, wherein the backup period defines the amount of time that electrical energy is provided from the battery system to the external system.

* * * * *